United States Patent [19]

Kurita et al.

[11] Patent Number: 4,602,959
[45] Date of Patent: Jul. 29, 1986

[54] METHOD FOR PREVENTING MULTIPLICATION OF ALGAE

[75] Inventors: Akitsugu Kurita; Shinji Kida; Masaaki Otsuki, all of Ohta, Japan

[73] Assignee: Toshiba Silicone Co., Ltd., Japan

[21] Appl. No.: 724,131

[22] Filed: Apr. 17, 1985

[30] Foreign Application Priority Data

May 9, 1984 [JP] Japan .................................. 59-92672

[51] Int. Cl.[4] .............................................. C09D 5/16
[52] U.S. Cl. ................. 106/18.32; 106/15.05; 106/287.11; 106/287.12; 106/287.14; 428/447; 514/63
[58] Field of Search ........... 106/18.32, 287.11, 287.12, 106/287.14; 428/447; 514/63

[56] References Cited

U.S. PATENT DOCUMENTS 4,080,190   3/1978   Law et al. .............................. 514/63

Primary Examiner—Lorenzo B. Hayes
Attorney, Agent, or Firm—Gary L. Loser

[57] ABSTRACT

Disclosed is a method for preventing multiplication of algae which is characterized by coating the surfaces of solid materials with a silicone emulsion composition prepared by emulsion polymerization of:

(1) 0.1 to 60% by weight of a reaction product prepared by reacting
  (A) 50 to 99.9% by weight of a polydiorganosilozane having more than one silanol group on the average in each molecule and having a viscosity of 5 to 10,000 cSt at 25° C. with
  (B) 0.1 to 50% by weight of a product prepared by reacting (a) 1 mol of a compound represented by the formula:

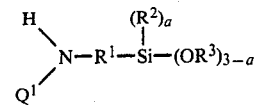

wherein $Q^1$ is a monovalent group selected from the group consisting of a hydrogen atom, $-CH_3$, $-CH_2CH_2NH_2$ and $-CH_2CH_2NHCH_2CH_2NH_2$, $R^1$ is a divalent hydrocarbon group having 1 to 4 carbon atoms, $R^2$ and $R^3$ are monovalent hydrocarbon groups each having 1 to 4 carbon atoms, and a is an integer of 0 or 1, with (b) 0.5 to 3.0 mol of a compound represented by the formula:

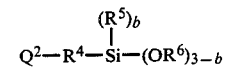

wherein $Q^2$ is an epoxy group-containing group selected from a glycidoxy group and an epoxycyclohexyl group, $R^4$ is a divalent hydrocarbon group having 2 to 4 carbon atoms, $R^5$ and $R^6$ are monovalent hydrocarbon groups each having 1 to 4 carbon atoms, and b is an integer of 0 or 1, and (2) 1 to 50% by weight of a compound represented by the formula:

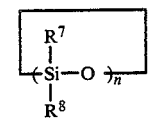

wherein $R^7$ and $R^8$ are same or different substituted or unsubstituted hydrocarbon groups each having 1 to 50 carbon atoms, and n is an integer of 3 or more, in the presence of (3) 0.1 to 20% by weight of a quaternary ammonium salt surface active agent and (4) 20 to 90% by weight of water.

5 Claims, No Drawings

METHOD FOR PREVENTING MULTIPLICATION OF ALGAE

The present application claims priority of Japanese patent application Ser. No. 84/92672, filed May 9, 1984.

BACKGROUND OF THE INVENTION

The present invention relates to a method for preventing multiplication of algae by the use of a silicone emulsion and, more particularly, to a method for preventing multiplication of algae by utilization of a cationic emulsion of a polydiorganosiloxane containing an amino group, an epoxy group and a hydroxyl group as functional groups.

It is well known that algae multiply in an aqueous medium, for example, in a water system, and adhere to and accumulate on the surfaces of solid materials therein. For example, the algae adhere to a fishing net, and the surface of the net is thus contaminated therewith, so that fishing work is disturbed and the durability of the net is remarkably impaired thereby. Further, in a closed system apparatus using an aqueous medium, valves disposed in the pipings are often clogged with algae.

In order to overcome these disadvantages, there have heretofore been suggested some methods for preventing multiplication of the algae. For the protection of the fishing nets used in fishing work, anticontaminating agents are generally used. However, most of the agents for the fishing nets contain, as effective components, organic tin compounds having heavy metals harmful to human beings, and which harmful components tends to get into fish and accumulate therein. Moreover, with regard to the closed system apparatus, it has been suggested and practiced to clean the apparatus with water containing a chlorine gas. This method is effective to inhibit multiplication of the algae, but its applicable fields are limited narrowly since the chlorine gas used in this method is toxic to animate creatures coexistent with the algae, for example, shell and fish, and additionally human beings.

The present inventors have conducted intensive research in order to overcome the problems of the conventional techniques, and as a result, they have found that when the surfaces of the solid materials are coated with an emulsion composition of a polydiorganosiloxane containing a quaternary ammonium salt, the emulsion composition can prevent the algae from adhering to and accumulating on the solid materials. Furthermore, this composition does not have any bad influence on animate creatures such as fish. On the aforesaid knowledge, the present invention has now been completed.

SUMMARY OF THE INVENTION

An object of the present invention is to provide a method for preventing multiplication of algae by the use of a silicone emulsion composition which has excellent film-forming properties, adhesiveness and stability, and which is especially suitable for surface treatment of fishing nets and the like.

That is to say, the present invention is directed to a method for preventing multiplication of algae comprising coating the surfaces of materials with a composition comprising a silicone emulsion prepared by emulsion polymerization of:

(1) 0.1 to 60% by weight of a reaction product prepared by reacting
  (A) 50 to 99.9% by weight of a polydiorganosiloxane having more than one silanol group on the average in each molecule and having a viscosity of 5 to 10,000 cSt at 25° C. with
  (B) 0.1 to 50% by weight of a product prepared by reacting (a) 1 mole of a compound represented by the formula:

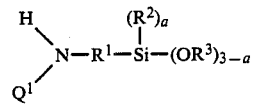

wherein $Q^1$ is a monovalent group selected from the group consisting of a hydrogen atom, $-CH_3$, $-CH_2CH_2NH_2$ and $-CH_2CH_2NHCH_2CH_2NH_2$; $R^1$ is a divalent hydrocarbon group having 1 to 4 carbon atoms; $R^2$ and $R^3$ are monovalent hydrocarbon groups each having 1 to 4 carbon atoms; and a is an integer of 0 or 1, with (b) 0.5 to 3.0 mole of a compound represented by the formula:

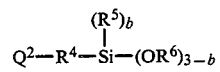

wherein $Q^2$ is an epoxy group-containing group selected from a glycidoxy group and an epoxycyclohexyl group; $R^4$ is a divalent hydrocarbon group having 2 to 4 carbon atoms; $R^5$ and $R^6$ are monovalent hydrocarbon groups each having 1 to 4 carbon atoms; and b is an intger of 0 or 1, and (2) 1 to 50% by weight of a compound represented by the formula:

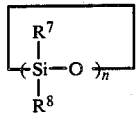

wherein $R^7$ and $R^8$ may be the same or different and are substituted or unsubstituted hydrocarbon groups each having 1 to 50 carbon atoms; and n is an integer of 3 or more, in the presence of (3) 0.1 to 20% by weight of a guaternary ammonium salt surface active agent and (4) 20 to 90% by weight of water.

DESCRIPTION OF THE INVENTION

The polydiorganosiloxane (A) used as the starting material for Component (1) in the composition of the present invention has more than one silanol group on the average in its molecule, but preferably both ends of Component (a) are terminated with silanol groups. The organic groups bonded to silicon can be alkyl groups such as methyl, ethyl, butyl, hexyl, decyl and dodecyl groups; aralkyl groups such as β-phenylethyl and β-phenylpropyl groups; a phenyl group or a vinyl group. From the viewpoint of ease of synthesis, the polydiorganosiloxane preferably contains methyl and phenyl groups and the former group is especially preferable.

The viscosity of the polydiorganosiloxane is within the range of 5 to 10,000 cSt, preferably 50 to 1,000 cSt at a temperature of 25° C. When the viscosity of the polydiorganosiloxane is less than 5 cSt, i.e. when its molecular weight is lower, the content of silanol groups will increase and the stability of its reaction product with Component (B) will be lower. On the other hand, when the viscosity thereof is more than 10,000 cSt, the reaction product with Component (B) will have too high a viscosity and will be difficult to emulsify, and due to the decrease in the terminal silanol groups and the consumption of a great deal of Component (2) to lower the viscosity of the system, the amount of Component (B) will decrease, with the result that a good film of the emulsion composition cannot be obtained.

Component (B) of Component (1) is the reaction product of Compounds (a) and (b). The amino group-containing silane of Compound (a) can be represented by the formula (I):

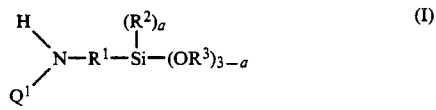

wherein $Q^1$ is a monovalent group selected from the group consisting of a hydrogen atom, $-CH_3$, $-CH_2CH_2NH_2$ and $-CH_2CH_2NHCH_2CH_2NH_2$; $R^1$ is a divalent hydrocarbon group having 1 to 4 carbon atoms; $R^2$ and $R^3$ are monovalent hydrocargon groups each having 1 to 4 carbon atoms; and a is an integer of 0 or 1.

Examples of such silanes containing amino group(s) are γ-aminopropyltriethoxysilane, γ-aminopropylmethyldiethoxysilane, N-(γ-aminoethyl)aminomethyltrimethoxysilane, γ-[N-(β-aminoethyl)amino]propyltrimethoxysilane, γ-[N-(β-aminoethyl)amino]propylmethyldimethoxysilane, N-(β-aminoethyl)aminomethyltributoxysilane and γ-[N-{β-(N-(β-aminoethyl))amino}ethyl{amino]propyltrimethoxysilane.

The epoxy group-containing silane which is Compound (b) is a compound represented by the formula (II):

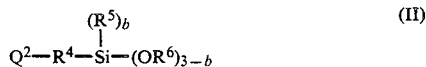

wherein $Q^2$ is an expoxy group-containing group selected from a glycidoxy group and an epoxycyclohexyl group; $R^4$ is a divalent hydrocarbon group having 2 to 4 carbon atoms; $R^5$ and $R^6$ are monovalent hydrocarbon groups each having 1 to 4 carbon atoms; and b is an integer of 0 or 1.

In the above-mentioned formula (II), the divalent hydrocarbon groups having 2 to 4 carbon atoms, and represented by $R^4$, include, for example, ethylene, propylene and butylene groups, and the monovalent hydrocarbon groups, each having 1 to 4 carbon atoms, and represented by $R^5$ and $R^6$ include, for example, methyl, ethyl, n-propyl, isopropyl, n-butyl and isobutyl groups.

Specific examples of silanes containing an expoxy group include γ-glycidoxypropyltrimethoxysilane, γ-glycidoxypropylmethyldimethoxysilane, β-(3,4-epoxycyclohexyl)-ethyltrimethoxysilane, β-(3,4-epoxycyclohexyl)ethylmethyldimethoxysilane, β-(3,4-epoxycyclohexyl)ethyltriethoxysilane and β-(3,4-epoxycyclohexyl)ethyldiethoxysilane.

Component (B) can be prepared by reacting Compound (a) with Compound (b) in a (former:latter) ratio of 1 mole:0.5-3.0 moles, preferably 1 mole:0.75-1.5 moles. This reaction is generally carried out by first mixing both Compounds (a) and (b) and then heating the resultant mixture with stirring at a temperature of 20° to 80° C. In this case, the reaction product of Compounds (a) and (b) may contain some unreacted materials. When the ratio of Compound (b) to 1 mole of Compound (a) is less than 0.5 mole or more than 3.0 moles, the silane content in either of the compounds which will take part in the reaction will be small, so that in a reaction mixture system obtained by the reaction of Compounds (a) and (b), the content of functional groups will be lower, and the desired cross-linking structure cannot be obtained.

Component (1) can be obtained by reacting Component (A) with Component (B) in a manner known in the art. It is to be noted that a preferred ratio of Component (A):Component (B) is 50–99.9% by weight:0.1–50% by weight. When the ratio of Component (B) to Component (A) is in excess of 50% by weight, their reaction product will have poor stability, and gelation will disadvantageously occur during reaction on occasion. For the preparation of Component (1), for example, Components (A) and (B) are placed in a reactor and are then reacted under a nitrogen gas stream at a temperature of 40° to 60° C. for 1 to 5 hours.

The thus obtained Component (1) can be used in an amount within the range of 0.1 to 60% by weight, preferably 1 to 30% by weight in the silicone emulsion composition. When the amount of Component (1) is less than 0.1% by weight, a film having good adhesion cannot be prepared; when it is more than 60% by weight, its emulsification will be difficult.

The cyclic organosiloxane of Component (2) is a compound represented by the formula (III):

wherein $R^7$ and $R^8$ may be the same or different and are substituted or unsubstituted hydrocarbon groups each having 1 to 50 carbon atoms; and n is an integer of 3 or more.

Examples of the hydrocarbon groups represented by $R^7$ and $R^8$ include straight or branched alkyl groups (e.g., methyl, ethyl, hexyl, octyl, and decyl, hexadecyl and octadecyl groups); alkenyl groups (e.g., vinyl, allyl and butadienyl groups); aryl groups (e.g., phenyl, naphthyl and xenyl groups); and aralkyl groups (e.g., benzyl, β-phenylethyl, methylbenzyl and naphthylmethyl groups). Moreover, examples of substitutents for the hydrocarbon groups include halogen atoms such as fluorine and chorine and a cyano group.

Component (2) is used in an amount of 1 to 50% by weight, preferably 5 to 30% by weight of the silicone emulsion composition. When the amount of Component (2) is less than 1% by weight or more than 50% by weight, the emulsion which has undergone polymerization will be unstable. Furthermore, it is preferred from the viewpoint of stability of the emulsion that the total amount of Components (1) and (2) is within the range of 20 to 60% by weight of the silicone emulsion composition.

The quaternary ammonium salt surface active agent of Component (3) plays an important role in preventing the multiplication of the algae. Examples of such surface active agents include alkyltrimethylammonium salts (e.g., octadecyltrimethylammonium chloride and hexadecyltrimethylammonium chloride); dialkyldimethylammonium salts (e.g., dioctadecyldimethylammonium chloride, dihexadecyldimethylammonium chloride and didodecyldimethylammonium chloride); and benzalkonium chlorides (e.g., octadecyldimethylbenzylammonium chloride and hexadecyldimethylbenzylammonium chloride). In view of the effect of preventing the algae from multiplication, preferred surface active agents are alkyl trimethylammonium salts and dialkyldimethyl ammonium salts in which each alkyl group has 12 to 22 carbon atoms.

The amount of the surface active agent (3) to be used is within the range of 0.1 to 20% by weight, preferably 0.5 to 8% by weight of the silicone emulsion composition. When the amount of the surface active agent (3) is less than 0.1% by weight or more than 20% by weight, it will be impossible to obtain a good emulsifying state.

The amount of the water used in the present invention is within the range of 20 to 90% by weight, preferably 40 to 80% by weight of the silicone emulsion composition. When the amount of water is less than 20% by weight or more than 90% by weight, a good emulsifying state will not be obtained and the emulsion will be unstable.

The composition of the present invention can be prepared by first mixing Components (1), (2), (3) and (4), dispersing them roughly, emulsifying them by the use of an emulsifying device such as a colloid mill or a homogenizer to form a uniform emulsion, and heating it with stirring to effect emulsion polymerization. Preferably, the emulsion polymerization is carried out in the presence of an emulsion polymerization catalyst, and it is especially preferred to employ potassium hydroxide as the catalyst for the emulsion polymerization. The amount of catalyst for the emulsion polymerization is preferably within the range of 0.1 to 3% by weight based on the total amount of Components (1) and (2). Further, a nonionic surface active agent can be included in the reaction system in order to prepare a good composition. Examples of nonionic surface active agents include glycerin fatty acid esters, sorbitan fatty acid esters, polyoxyethylenes (hereinafter referred to as POE), alkyl ethers, POE sorbitan fatty acid esters, POE glycerin fatty acid esters, POE alkylphenol ethers and POE polyoxypropylene block-copolymers. The reaction temperature of the emulsion polymerization is generally within the range of 30° to 90° C., preferably 60° to 80° C.

The thus prepared composition of the present invention is a silicone emulsion composition having excellent film-forming properties, adhesion and stability, as illustrated in the following examples and comparative example. Coating the surfaces of solid materials such as fishing nets with this composition can be carried out by, for example, dipping the materials into a dispersion in which the aforementioned composition is diluted with water, wringing, drying at a constant temperature for a predetermined period of time, and thermally treating them, if necessary.

EXAMPLE

Now, the present invention will be described in detail with reference to examples and a comparative example given below, however, they are not intended to limit the scope of the present invention.

EXAMPLE 1

First, 10 parts of an equimolar reaction product of γ-[N-(β-aminoethyl)amino]propyltrimethoxysilane and β-(3,4-epoxycyclohexyl)ethyltriethoxysilane were reacted with 90 parts of a polydimethylsiloxane of which both ends were terminated with silanol groups and which had a viscosity of 200 cSt at 25° C., this reaction being accomplished at 80° C. for 3 hours to prepare a colorless oily base oil A.

Afterward, 8 parts of the base oil A, 27 parts of octamethylcyclotetrasiloxane, 5 parts of dioctadecyldimethylammonium chloride, 59.5 parts of water and 0.5 part of potassium hydroxide were mixed by stirring, and the resultant mixture was caused to pass through a colloid mill having a mill space which was adjusted to 10 mils. The thus prepared emulsion was then heated with stirring at 75° C. for 3 hours and was cooled with stirring to 40° C., followed by neutralization with hydrochloric acid in order to prepare Composition A.

EXAMPLE 2

First, 15 parts of an equimolar reaction product of γ-aminopropyltriethoxysilane and γ-glycidoxypropylmethyldimethoxysilane were reacted with 85 parts of a polydimethylsiloxane of which both ends were terminated with silanol groups and which had a viscosity of 100 cSt at 25° C., this reaction being accomplished at 80° C. for 5 hours to prepare a colorless oily base oil B. Afterward, 15 parts of the base oil B, 20 parts of octamethylcyclotetrasiloxane, 5 parts of dihexadecyldimethylammonium chloride, 59.5 parts of water and 0.5 part of potassium hydroxide were used, and the same procedure as in Example 1 was repeated in order to prepare Composition B-1. To 100 parts of the Composition B-1, 3 parts of sorbitan monolaurate were added, and stirring and then mixing were carried out at room temperature to prepare Composition B-2.

EXAMPLE 3

First, 10 parts of an equimolar reaction product of γ-aminopropyltriethoxysilane and β-(3,4-epoxycyclohexyl)-ethyltriethoxysilane were reacted with 90 parts of a polydimethyldiphenylsiloxane consisting of 10 mole % of a diphenylsiloxy unit and 90 mole % of a dimethylsiloxy unit, of which siloxane both ends were terminated with silanol groups and which had a viscosity of 500 cSt at 25° C., this reaction being accomplished at 80° C. for 3 hours to prepare a colorless oily base oil C.

Then, 10 parts of the base oil C, 25 parts of a mixture of 72% by weight of octamethylcyclotetrasiloxane and 28% by weight of decamethylcyclopentasiloxane, 4 parts of dihexadecyldimethylammonium chloride, 60.5 parts of water and 0.5 part of potassium hydroxide were mixed by stirring, and the resultant mixture was caused to pass through a colloid mill having a mill space which was adjusted to 10 mils, whereby its emulsification was accomplished. The thus prepared emulsion was then heated with stirring at 70° C. for 4 hours and was cooled with stirring to 40° C., followed by neutralization with hydrochloric acid in order to prepare Composition C.

COMPARATIVE EXAMPLE

First, 8 parts of polydimethylsiloxane, as a base oil, of which both ends were terminated with silanol groups and which had a viscosity of 500 cSt at 25° C., 27 parts of octamethylcyclotetrasiloxane, 5 parts of dioctadecyldimethylammonium chloride, 59.5 parts of water and 0.5 part of potassium hydroxide were mixed by stirring, and the resultant mixture was caused to pass through a colloid mill having a mill space of which was adjusted to 10 mils and was heated with stirring at 75° C. for 8 hours. The mixture was cooled with stirring to a level of 40° C., followed by neutralization with hydrochloric acid to prepare Composition D.

Compositions A to D, obtained by the above-mentioned examples and comparative example, were employed in the following manner to evaluate their ability to prevent algae from multiplying.

TEST 1

Each composition was diluted with water 30-fold, streamingly applied onto a cleaned glass slide, dried at 120° C. for 5 minutes, and treated thermally at 180° C. for 11 hours. The thus prepared samples were washed with clean water and then dried. They were then hung vertically in an aqueous solution containing grown algae. Subsequently, they were taken out from the solution after 3 days and after 7 days and inspected from accumulation of algae.

The results are shown in Table 1.

TABLE 1

| Composition | A | B-1 | B-2 | C | D | Untreated |
|---|---|---|---|---|---|---|
| Accumulation of algae (after 3 days) | None | None | None | None | Slight | Covered with grown algae |
| Accumulation of algae (after 7 days) | None | None | None | None | Covered with grown algae | Covered with grown algae |

TEST 2

A dispersion in which each composition was diluted with water 30-fold was placed in a beaker, and a polyester fishing net was dipped into each solution. The net was taken out after 5 minutes. Wringing and then drying were carried at 120° C. for 5 minutes, and each net was subjected to a heating treatment at 180° C. for 11 minutes.

These samples were sunk as deeply as 15 m in seawater containing algae and were taken out after 7 days, and accumulation of the algae thereon inspected. The results are shown in Table 2.

TABLE 2

| Composition | A | B-1 | B-2 | C | D | Untreated |
|---|---|---|---|---|---|---|
| Accumulation of algae | none | None | None | None | Covered with grown algae | Covered with grown algae |

It will be understood from the results above that the method of the present invention can prevent the multiplication of algae effectively.

Further, the present invention utilizes no heavy metal and thus has no problem of toxicity.

We claim:

1. A method for preventing multiplication of algae comprising coating the surfaces of materials with a composition comprising silicone emulsion prepared by emulsion polymerization of:
   (1) 0.1 to 60% by weight of a reaction product prepared by reacting
      (A) 50 to 99.9% by weight of a polydiorganosiloxane having more than one silanol group on the average in each molecule and having a viscosity of 5 to 10,000 cSt at 25° C. with
      (B) 0.1 to 50% by weight of a product prepared by reacting (a) 1 mole of a compound represented by the formula:

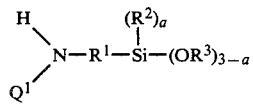

wherein $Q^1$ is a monovalent group selected from the group consisting of a hydrogen atom, $-CH_3$, $-CH_2CH_2NH_2$ and $-CH_2CH_2NHCH_2CH_2NH_2$, $R^1$ is a divalent hydrocarbon group having 1 to 4 carbon atoms, $R^2$ and $R_3$ are monovalent hydrocarbon groups each having 1 to 4 carbon atoms, and a is an integer of 0 or 1,
with (b) 0.5 to 3.0 moles of a compound represented by the formula:

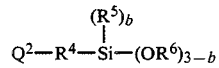

wherein $Q^2$ is an epoxy group-containing group selected from a glycidoxy group and an epoxycyclohexyl group, $R^4$ is a divalent hydrocarbon group having 2 to 4 carbon atoms, $R^5$ and $R^6$ are monovalent hydrocarbon groups each having 1 to 4 carbon atoms, and b is an integer of 0 or 1, and
   (2) 1 to 50% by weight of a compound represented by the formula:

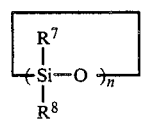

wherein $R^7$ and $R^8$ are same or different substituted or unsubstituted hydrocarbon groups each having 1 to 50 carbon atoms, and n is an integer of 3 or more, in the presence of
   (3) 0.1 to 20% by weight of a quaternary ammonium salt surface active agent and
   (4) 20 to 90% by weight of water.

2. The method for preventing multiplication of algae according to claim 1, wherein both ends of said polydiorganosiloxane are terminated with silanol groups.

3. The method for preventing multiplication of algae according to claim 1, wherein the viscosity of said polydiorganosiloxane at 25° C. is within the range of 50 to 1,000 cSt.

4. The method for preventing multiplication of algae according to claim 1, wherein said emulsion polymerization is carried out additionally in the presence of a nonionic surface active agent.

5. The method for preventing multiplication of algae according to claim 1, wherein said emulsion polymerization is carried out using potassium hydroxide as a catalyst.

* * * * *